US010656364B2

(12) United States Patent
Lin

(10) Patent No.: US 10,656,364 B2
(45) Date of Patent: May 19, 2020

(54) SCREEN FILM STRUCTURE WITH MAGNET ASSEMBLY

(71) Applicants: SOLUTION EXPERT 33 INTERNATIONAL CO., LTD. TAIWAN BRANCH (B.V.I.), New Taipei (TW); SENSEAGE CO., LTD., Taipei (TW); DONGGUAN SOLUTION 33 ELECTRONIC TECHNOLOGY CO., LTD., Dongguan (CN); SOLUTION EXPERT 33 INTERNATIONAL CO., LTD., Tortola (VG)

(72) Inventor: Ben-Tien Lin, New Taipei (TW)

(73) Assignees: SOLUTION EXPERT 33 INTERNATIONAL CO., LTD. TAIWAN BRANCH (B.V.I.), New Taipei (TW); SENSEAGE CO., LTD., Taipei (TW); DONGGUAN SOLUTION 33 ELECTRONIC TECHNOLOGY CO., LTD., Dongguan, Guangdong (CN); SOLUTION EXPERT 33 INTERNATIONAL CO., LTD., Tortola (VG)

( * ) Notice: Subject to any disclaimer, the term of this patent is extended or adjusted under 35 U.S.C. 154(b) by 184 days.

(21) Appl. No.: 15/984,414

(22) Filed: May 21, 2018

(65) Prior Publication Data

US 2019/0170962 A1 Jun. 6, 2019

(30) Foreign Application Priority Data

Dec. 6, 2017 (TW) .............................. 106218136 U

(51) Int. Cl.
*G02B 27/00* (2006.01)
*G02B 7/00* (2006.01)
(Continued)

(52) U.S. Cl.
CPC ................. *G02B 7/00* (2013.01); *H01F 7/02* (2013.01); *H01F 7/0252* (2013.01); *G02B 27/4272* (2013.01)

(58) Field of Classification Search
CPC .............. G02B 2207/123; G03B 17/56; G03B 17/565; B60R 1/00; B60R 1/083
(Continued)

(56) References Cited

U.S. PATENT DOCUMENTS 4,351,557 A * 9/1982 Chary ........................ B60J 3/06
296/97.7

FOREIGN PATENT DOCUMENTS

CA 2980797 A1 * 12/2016 ............ B60J 1/2011

* cited by examiner

*Primary Examiner* — Arnel C Lavarias
(74) *Attorney, Agent, or Firm* — Chun-Ming Shih; HDLS IPR Sevices

(57) ABSTRACT

A screen film structure with a magnet assembly is used on a screen having a rim. The screen film structure includes a screen film and a magnet assembly. The magnet assembly includes a first magnet element and a second magnet element. The first magnet element is attached to the rim. The second magnet element is attached to the screen film. The first magnet element and the second magnet element are magnetically attracted to each other to arrange the screen film to cover the screen. Accordingly, it is easy and convenient to attach and detach the screen film structure, and the screen film is fastened firmly to the rim.

10 Claims, 6 Drawing Sheets

(51) Int. Cl.
 *H01F 7/02* (2006.01)
 *G02B 27/42* (2006.01)
(58) Field of Classification Search
 USPC ........ 359/612, 601, 609, 611, 614; 396/534,
  396/535, 544, 287, 661; 361/681, 686;
  358/906, 909.1; 386/117, 118; 345/905;
  348/842, 333.01, 841, 843, 844, 834
 See application file for complete search history.

SCREEN FILM STRUCTURE WITH MAGNET ASSEMBLY

TECHNICAL FIELD

The present invention relates to a screen film and, in particular, to a screen film structure with a magnet assembly.

BACKGROUND

Portable devices such as smart phones, tablet computers, laptop computers have become an increasingly indispensable part of daily life. According to research, information on portable devices is often peeped by others when the portable devices are used in public places. A screen privacy protective film (i.e. a screen privacy filter) is available in the market, which can be adhered on a screen or engaged on its housing for protecting users' privacy.

However, the installation of the screen privacy protective film has the following shortcomings. First, if the screen privacy protective film is adhered to the screen, adhesive residue often remains on the screen after the screen privacy protective film is removed from the screen. Therefore, it is impossible for the users to attach or detach the screen privacy protective film anytime and anywhere. In other words, it is troublesome to detach the screen privacy protective film. Second, if the screen privacy protective film is engaged on the housing, the screen privacy protective film may be detached accidently when the screen is turned over or gets bumped, creating a structural problem when the privacy protective film is engaged on the housing.

In view of this, the inventor studied various technologies and created an effective solution in the present disclosure.

SUMMARY

The present invention provides a screen film structure with a magnet assembly. The screen film structure is attached to a rim by means of a first magnet element. The second magnet element is attached to a screen film. The first magnet element and the second magnet element are magnetically attracted to each other and are detachable from each other. Accordingly, it is easy and convenient to attach and detach the screen film structure, and the screen film is fastened firmly to the rim.

According to one embodiment of the present invention, the present invention provides a screen film structure with a magnet assembly. The screen film structure is used for a screen having a rim. The screen film structure includes a screen film and a magnet assembly. The magnet assembly includes a first magnet element and a second magnet element. The first magnet element is attached to the rim. The second magnet is attached to the screen film. The first magnet element and the second magnet element are magnetically attracted to each other to arrange the screen film to cover the screen.

The second magnet element is an iron plate or a flexible magnet. The flexible magnet and the iron plate are bendable, so the second magnet element are flexible, and as a result, the screen film can keep its bent attitude without being deformed easily.

The first magnet element and the second magnet element are disposed at two opposite sides of the screen film. The distance between the screen and the screen film is only a thickness of the first magnet element, and thereby the screen film is not too far away from the screen and will not compromise the performance of the screen film.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Figure 1:
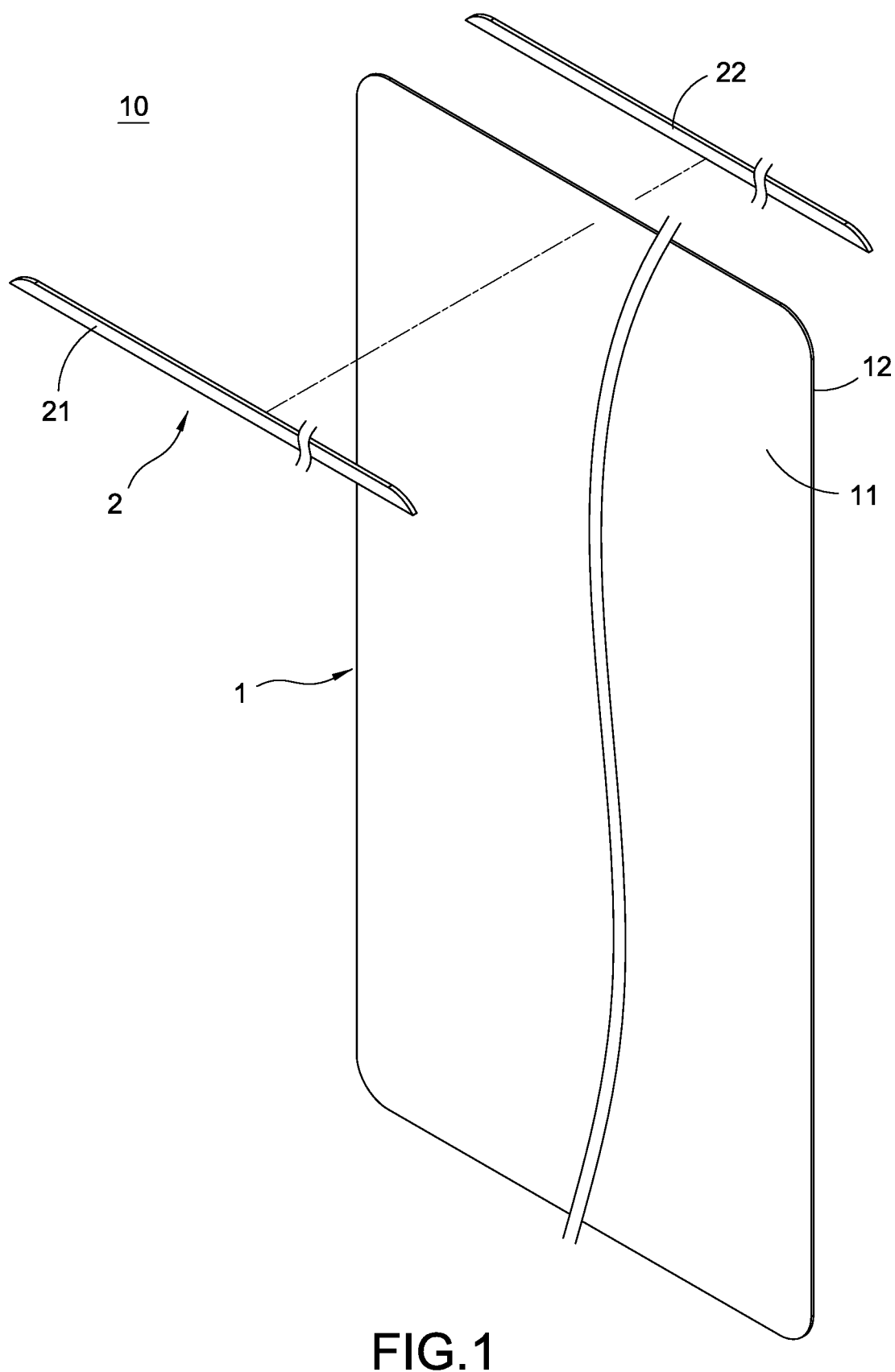
FIG. 1 is a perspective exploded view illustrating a screen film structure according to the present invention.
Figure 2:
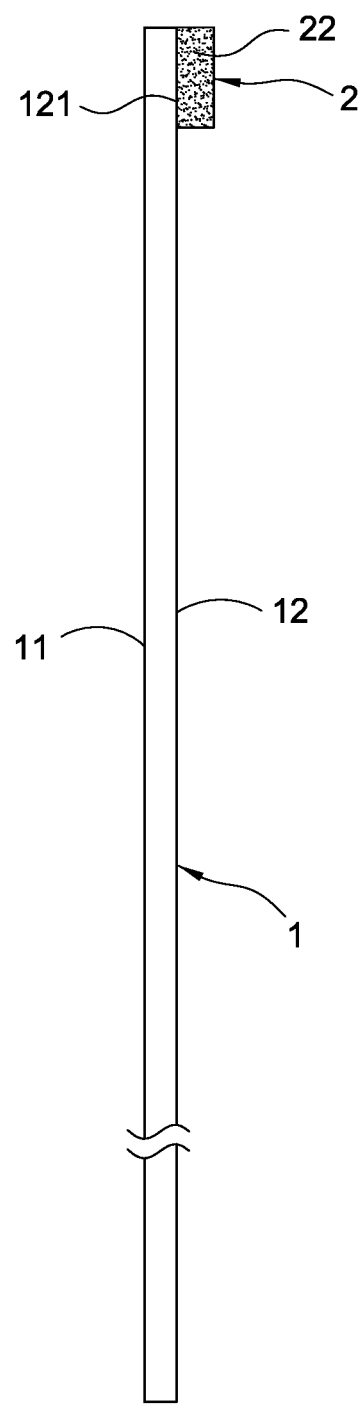
FIG. 2 is an assembled view illustrating the screen film structure.
Figure 3:
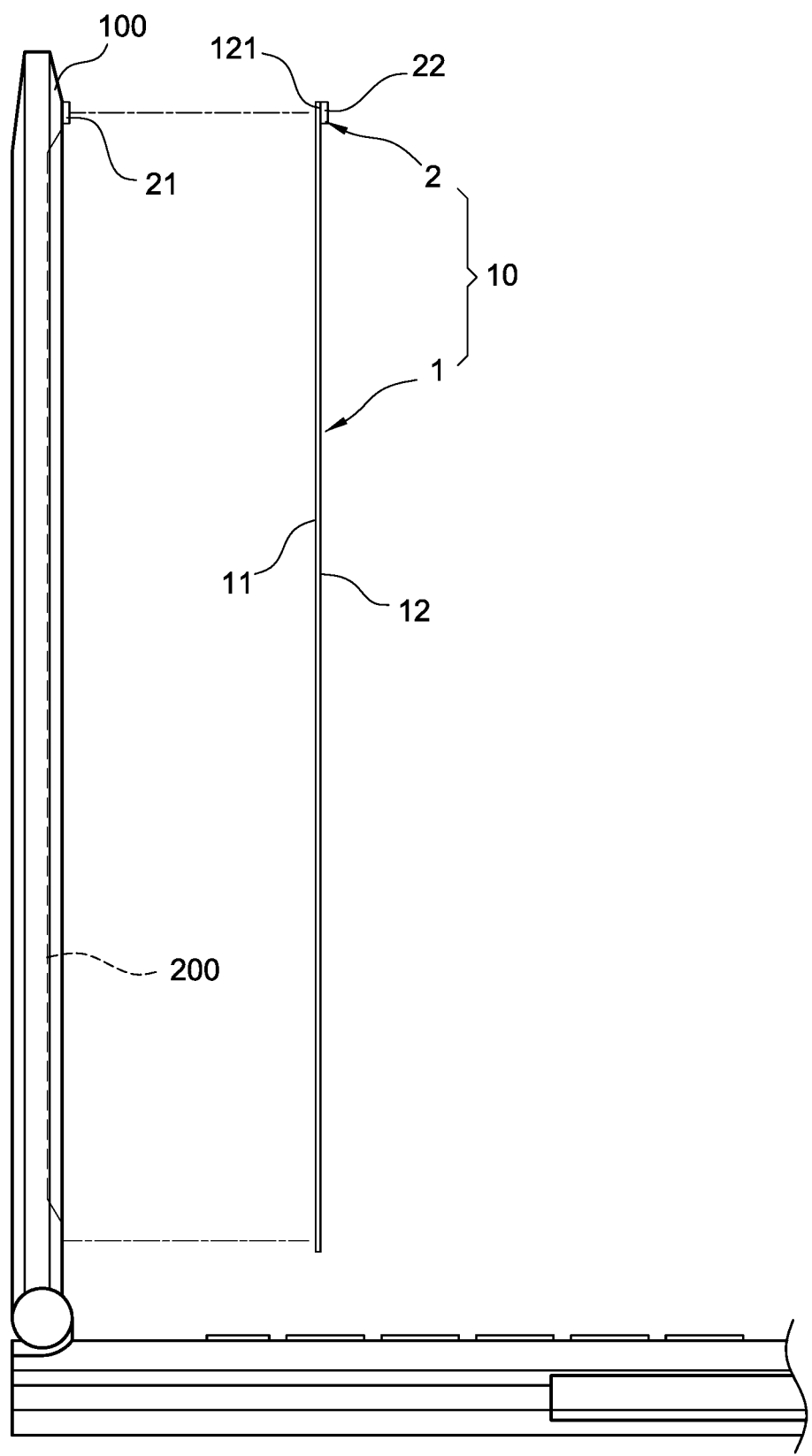
FIG. 3 is an in-use view illustrating the screen film structure.
Figure 4:
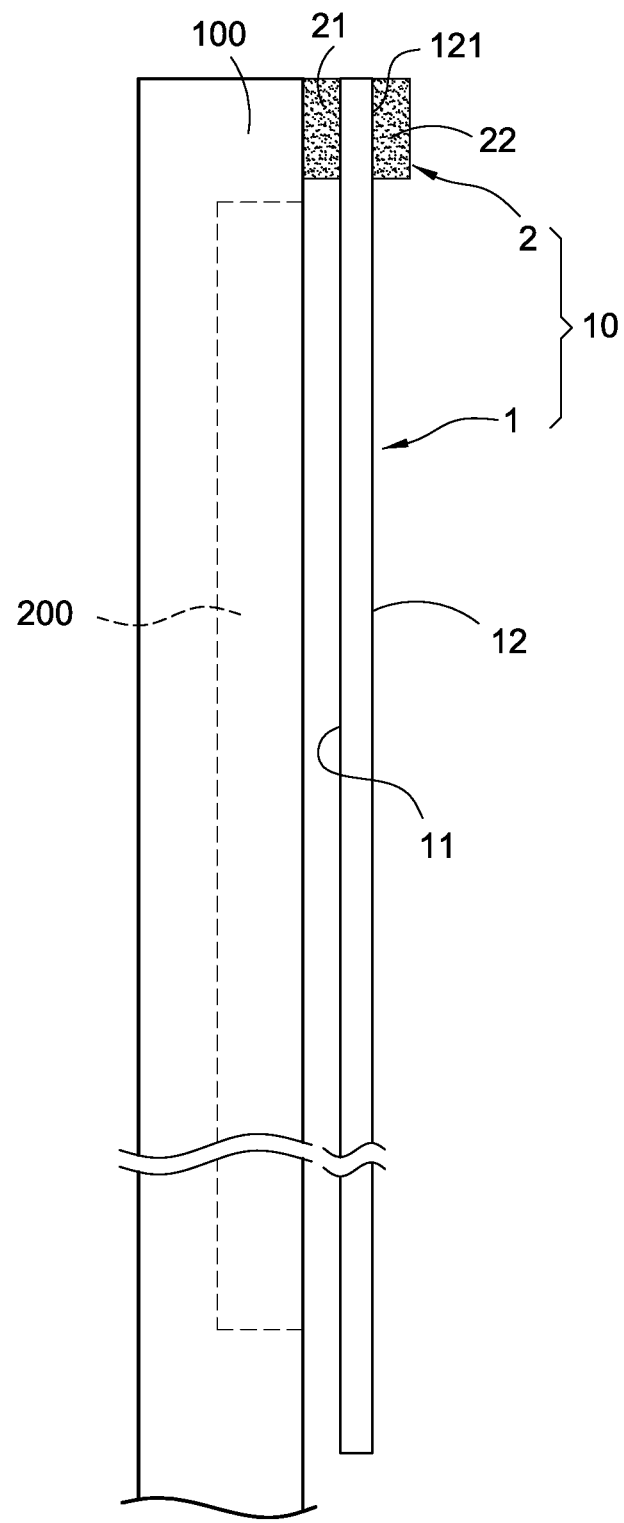
FIG. 4 is another in-use view illustrating the screen film structure.

Detailed descriptions and technical contents of the present disclosure are illustrated below in conjunction with the accompanying drawings. However, it is to be understood that the descriptions and the accompanying drawings disclosed herein are merely illustrative and exemplary and not intended to limit the scope of the present disclosure.

Referring to FIGS. 1 to 4, a screen film structure with a magnet assembly is provided, which is used on a screen 200 having a rim 100. The screen film structure 10 comprises a screen film 1 and a magnet assembly 2.

The screen film 1 includes a first surface 11 disposed relatively close to the screen 200 and a second surface 12 disposed relatively away from the screen 200. The second surface 12 includes an end edge 121.

The magnet assembly 2 includes a first magnet element 21 and a second magnet element 22. The first magnet element 21 is attached to the rim 100, and the second magnet 22 is attached to the screen film 1. The first magnet element 21 and the second magnet element 22 are magnetically attracted to each other to arrange the screen film 1 to cover the screen 200. Therefore, users can easily detach the screen film 1 from the rim 100 of the screen 200 anytime. The screen film structure 10 can be used with ease and manufactured at low costs.

In detail, the first magnet element 21 is disposed corresponding to the first surface 11 and the second magnet element 22. When the first magnet element 21 and the second magnet element 22 are magnetically attracted to each other, the first magnet element 21 is sandwiched between the rim 100 and the screen film 1 and contacts the first surface 11.

The second magnet element 22 can be attached to the end edge 121 of the second surface 12, but the second magnet element 22 can also be attached to the first surface 11; the present invention is not limited in this regard. When the second magnet element 22 is attached to the second surface 12, the first magnet element 21 is disposed on the first surface 11, and the second magnet element 22 is disposed on the second surface 12. Therefore, the distance between the screen 200 and the screen film 1 is only a thickness of the first magnet element 21, and thereby the screen film 1 is not too far away from the screen and will not compromise the performance of the screen film 1.

One of the first magnet element 21 and the second magnet element 22 is an iron plate, and the other one is a flexible magnet.

In the present embodiment, the flexible magnet and the iron plate are flexible, so the second magnet element 22 attached to the screen film 1 which is a flexible magnet or an iron plate is also flexible, and as a result, the screen film 1 can keep its bent attitude without being deformed easily.

The screen film 1 is preferably a screen privacy protective film (i.e. a screen privacy filter); however, the present invention is not limited in this regard. The screen privacy filter consists of, in order, from top to bottom, a resin layer, an adhesive layer, a grating layer, an adhesive layer and a resin layer (not illustrated). The grating layer (not illustrated) provides an unobstructed view within a particular range of viewing angles. The grating layer (not illustrated) consists of multiple opaque grating sheets and is implemented by microlouver principle. The grating sheets are equidistantly and parallel arranged (i.e. a louver structure) to form the grating layer, and they only allow light beams with a certain angle to go therethrough. In other words, the viewing angle is limited. If the viewing angle is zero degree (i.e. a viewer is looking in a direction perpendicular to a central portion of the screen), images are viewable since the light is not obstructed. On the contrary, when the viewing angle increases, the amount of light getting through the screen film decreases, and it is difficult to observe the images. This can provide privacy to the viewer by blocking observation by others and can keep personal or confidential information safe from prying eyes.

When a screen privacy protective film or the like is attached to the screen 200, it will reduce the brightness and resolution of the screen 200. This easily causes eye strain and discomfort after the viewer watching the screen 200 for a period of time. This shortcoming can be overcome and additional advantages are provided by using the screen film structure 10 of the present invention. When the viewer uses the screen film structure 10, the viewer can attach the screen film 10 to the rim 100 of the screen 200 by the second magnet element 22 magnetically attracted to the first magnet element 21, so that the screen film 1 stably covers the screen 200 to protect the viewer's privacy. When the viewer does not use the screen 200 or the viewer perceives eye strain, he can detach the second magnet element 22 from the first magnet element 21 to quickly remove the screen film 1. Accordingly, it is easy and convenient to attach and detach the screen film structure 10, and the screen film 1 is fastened firmly to the rim 100.

Figure 5:
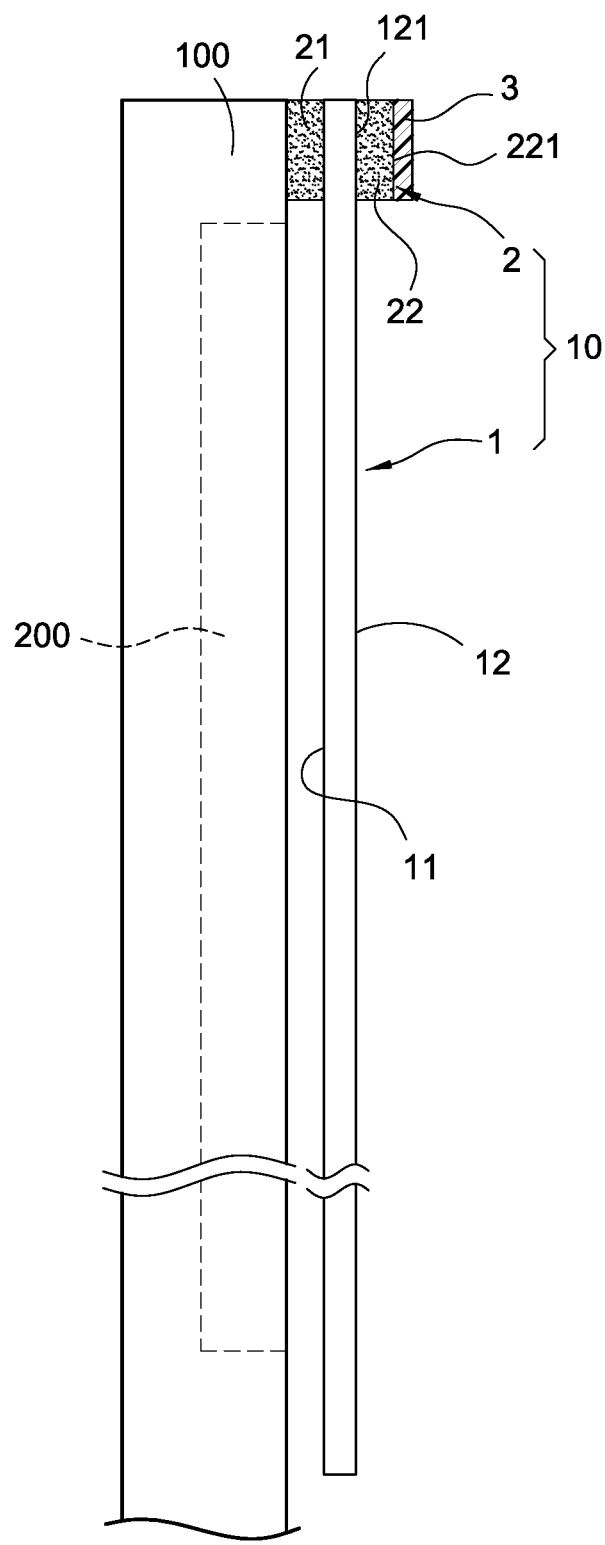
FIG. 5 is an in-use view illustrating the screen film structure according to another embodiment of the present invention.

Please refer to FIG. 5 which shows the screen film structure 10 according to another embodiment of the present invention. This embodiment shown in FIG. 5 is similar to the previous embodiment shown in FIGS. 1 to 4. However, the embodiment of FIG. 5 is different from the previous embodiment in that the embodiment of FIG. 5 further includes a decoration layer 3.

The second magnet element 22 includes an outer surface 221 away from the second surface 12, and the decoration layer 3 is attached to the outer surface 221 by coating or adhering to enhance the appearance. The decoration layer 3 consists of a polyethylene terephthalate (PET) film, a polycarbonate (PC) film or a MYLAR® film; however, the present invention is not limited in this regard.

Figure 6:
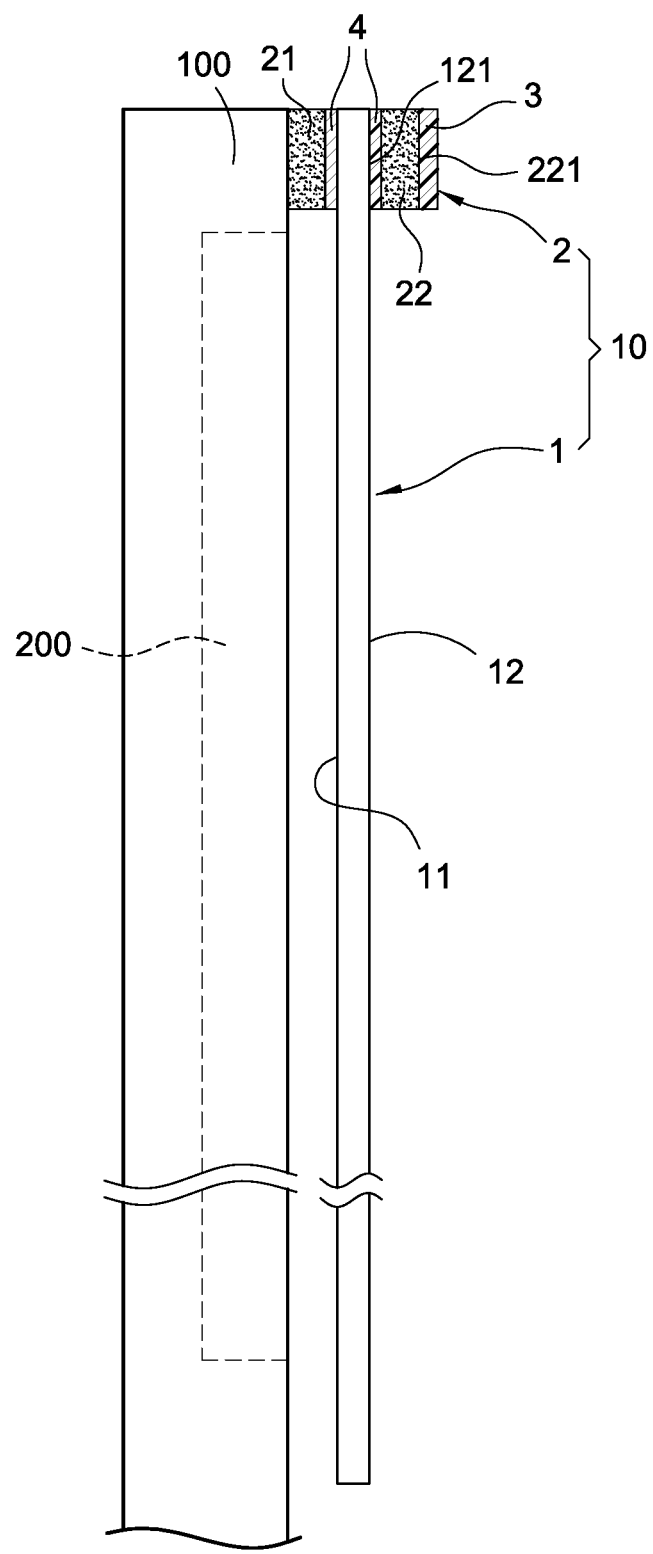
FIG. 6 is an in-use view illustrating the screen film structure according to still another embodiment of the present invention.

Please refer to FIG. 6 for the screen film structure 10 according to still another embodiment of the present invention. This embodiment is different from the embodiment of FIG. 5 in that, the screen film structure 10 further includes two adhesive layers 4.

In detail, one of the adhesive layers 4 is spread or adhered between first magnet element 21 and the rim 100, the other one of the adhesive layers 4 is spread or adhered between the second magnet element 22 and the screen film 1, the adhesive layer 4 consists of an epoxy resin adhesive (i.e. AB glue), a double-sided tape, a polyurethane adhesive, a metal glue, or other suitable adhesive; the present invention is not limited in this regard.

In summary, the present invention can certainly achieve the anticipated objects and solve the problems of conventional techniques, and has novelty, non-obviousness and industrial practicability, so the present invention completely meets the requirements of patentability. Therefore, a request to patent the present invention is filed according to patent laws. Examination is kindly requested, and allowance of the present invention is solicited to protect the rights of the inventor.

What is claimed is:

1. A screen film structure with a magnet assembly, for a screen having a rim, the screen film structure comprising:
   a screen film; and
   a magnet assembly, the magnet assembly including a first magnet element and a second magnet element, the first magnet element being attached to the rim, the second magnet being attached to the screen film, wherein the first magnet element and the second magnet element are magnetically attracted to each other to arrange the screen film to cover the screen,
   wherein one of the first magnet element and the second magnet element is an iron plate, and the other one is a flexible magnet.

2. The screen film structure with the magnet assembly according to claim 1, wherein the screen film includes a first surface disposed relatively close to the screen and a second surface disposed relatively away from the screen, the second magnet element is attached to the second surface, and the first magnet element is arranged corresponding to the first surface and the second magnet element.

3. The screen film structure with the magnet assembly according to claim 2, wherein the second surface includes an end edge, and the second magnet element is attached to the end edge of the second surface.

4. The screen film structure with the magnet assembly according to claim 1, wherein the screen film is a screen privacy protective film.

5. The screen film structure with the magnet assembly according to claim 1, further comprising two adhesive layers, one of the adhesive layers is spread or adhered between the first magnet element and the rim, the other one of the adhesive layers is spread or adhered between the second magnet element and the screen film, and the adhesive layer consists of an epoxy resin adhesive, a double-sided tape, a polyurethane adhesive, or a metal glue.

6. A screen film structure with a magnet assembly, for a screen having a rim, the screen film structure comprising:
   a screen film;
   a magnet assembly, the magnet assembly including a first magnet element and a second magnet element, the first magnet element being attached to the rim, the second magnet being attached to the screen film, wherein the first magnet element and the second magnet element are magnetically attracted to each other to arrange the screen film to cover the screen, wherein the screen film includes a first surface disposed relatively close to the screen and a second surface disposed relatively away from the screen, the second magnet element is attached to the second surface, and the first magnet element is arranged corresponding to the first surface and the second magnet element; and a decoration layer, wherein the second magnet element includes an outer surface away from the second surface, and the decoration layer is attached to the outer surface.

7. The screen film structure with the magnet assembly according to claim 6, wherein the decoration layer consists of a polyethylene terephthalate (PET) film or a polycarbonate (PC) film.

8. The screen film structure with the magnet assembly according to claim 6, wherein the second surface includes an end edge, and the second magnet element is attached to the end edge of the second surface.

9. The screen film structure with the magnet assembly according to claim 6, wherein the screen film is a screen privacy protective film.

10. The screen film structure with the magnet assembly according to claim 6, further comprising two adhesive layers, one of the adhesive layers is spread or adhered between the first magnet element and the rim, the other one of the adhesive layers is spread or adhered between the second magnet element and the screen film, and the adhesive layer consists of an epoxy resin adhesive, a double-sided tape, a polyurethane adhesive, or a metal glue.

* * * * *